United States Patent [19]

Gräfe et al.

[11] 4,367,991

[45] Jan. 11, 1983

[54] BORING TOOL

[75] Inventors: Werner Gräfe, Reutlingen; Paul Held, Sonnenbühl-Willmandingen, both of Fed. Rep. of Germany

[73] Assignee: Montanwerke Walter GmbH, Tübingen, Fed. Rep. of Germany

[21] Appl. No.: 214,532

[22] Filed: Dec. 9, 1980

Related U.S. Application Data

[63] Continuation of Ser. No. 13,989, Feb. 22, 1979, abandoned.

[30] Foreign Application Priority Data

Aug. 3, 1978 [DE] Fed. Rep. of Germany ....... 2834083

[51] Int. Cl.$^3$ ............................................. B23B 51/00
[52] U.S. Cl. .................................. 408/224; 408/186; 408/713
[58] Field of Search ............... 408/204, 211, 713, 189, 408/199, 186, 224, 705, 231, 207, 180, 239, 223

[56] References Cited

U.S. PATENT DOCUMENTS

| | | | |
|---|---|---|---|
| 313,405 | 3/1885 | Davis | 408/186 X |
| 3,028,773 | 4/1962 | Borneman | 408/211 |
| 3,203,493 | 8/1965 | Bergstrom | 408/180 |
| 3,274,863 | 9/1966 | Faber | 408/207 |
| 3,341,919 | 9/1967 | Lovendahl | 408/239 X |
| 3,354,526 | 11/1967 | Erkfritz | 408/211 |
| 3,540,323 | 11/1970 | Rishel | 408/186 |
| 3,938,231 | 2/1976 | Hopkins | 408/186 |
| 3,963,365 | 6/1976 | Shallenberger | 408/186 |
| 3,963,366 | 6/1976 | Eckle et al. | 408/199 |
| 4,072,438 | 2/1978 | Powers | 408/211 X |
| 4,149,821 | 4/1979 | Faber | 408/204 X |
| 4,194,862 | 3/1980 | Zweekly | 408/186 X |
| 4,268,198 | 5/1981 | Peters | 408/186 |

FOREIGN PATENT DOCUMENTS

| | | | |
|---|---|---|---|
| 2843788 | 5/1979 | Fed. Rep. of Germany | 408/713 |
| 173093 | 12/1965 | U.S.S.R. | 408/713 |

*Primary Examiner*—William R. Briggs

[57] ABSTRACT

To provide for self-centering of boring tools, particularly of larger diameter boring tools having replaceable rotatable cutter bits, the cutter bit closest to the central axis of the tool holder or tool shank, i.e. the radially innermost bit is formed with auxiliary cutting surfaces adjacent the corners of a square or parallelogram-shaped bit, for example by chamfering the corner, with a relief surface therebehind, and positioning the auxiliary cutting surface to intersect the central axis of the boring tool so that, in operation, a small conical tip will be left which is continuously reduced in size and cut; and wherein the cutter bits are positioned on the tool bodies to present cutting edges at the end face which overlap with respect to workpiece removal, so that each cutter bit will independently cut into the workpiece, at least the inner cutter bit being guided in its cutting circle by the radially outer corner fitting against the surface cut in the workpiece.

18 Claims, 24 Drawing Figures

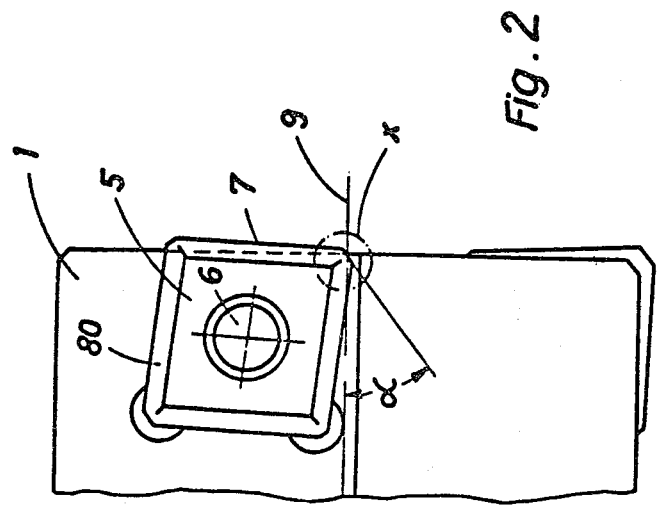
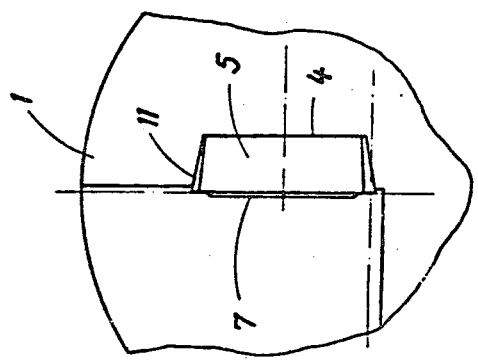

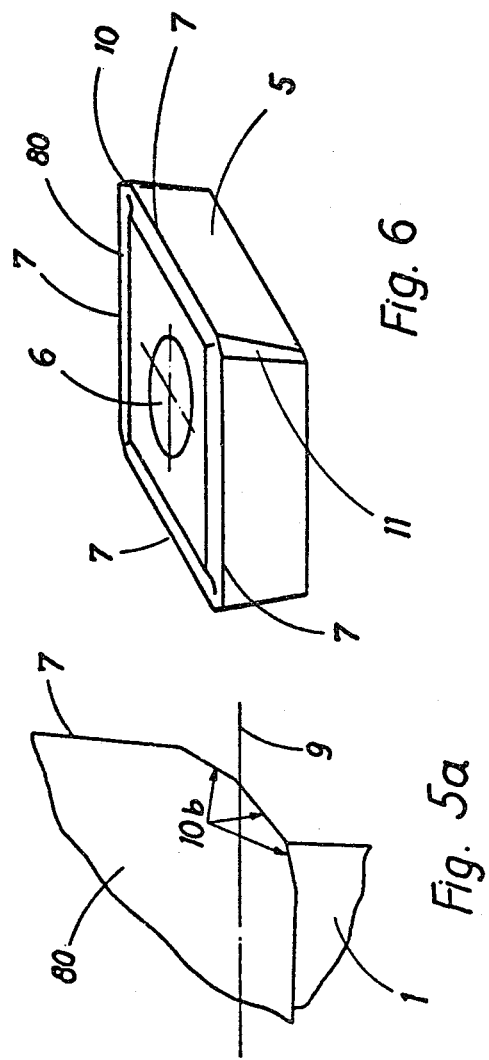

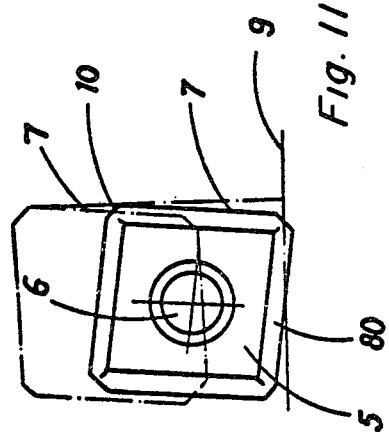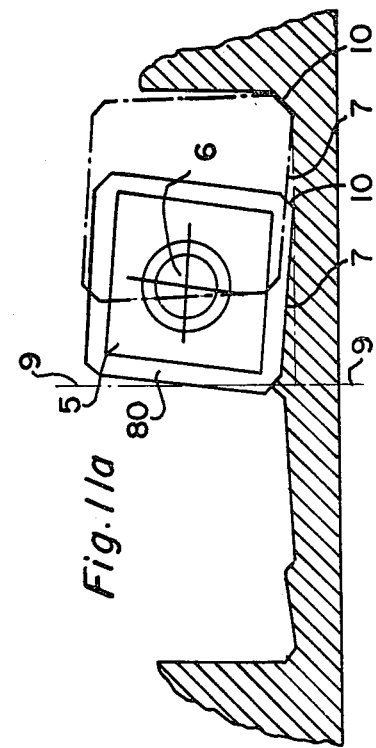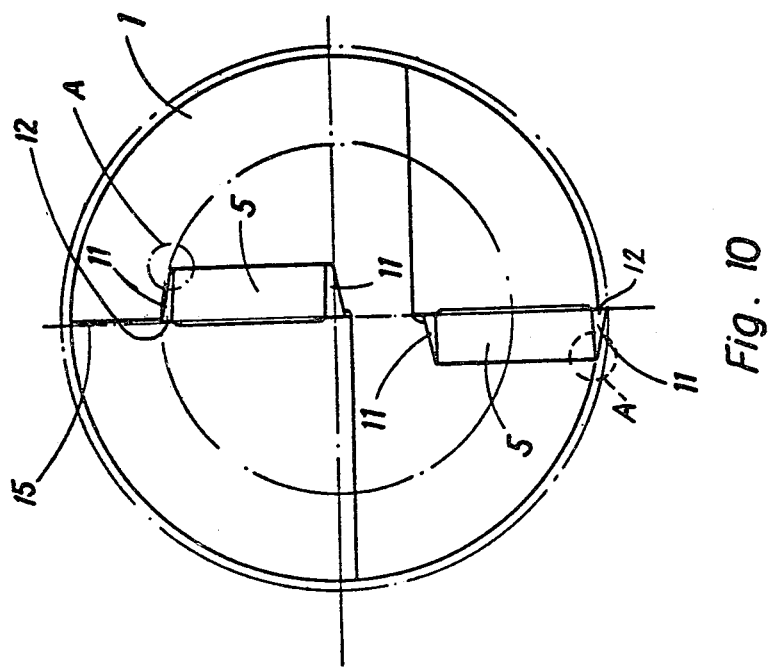

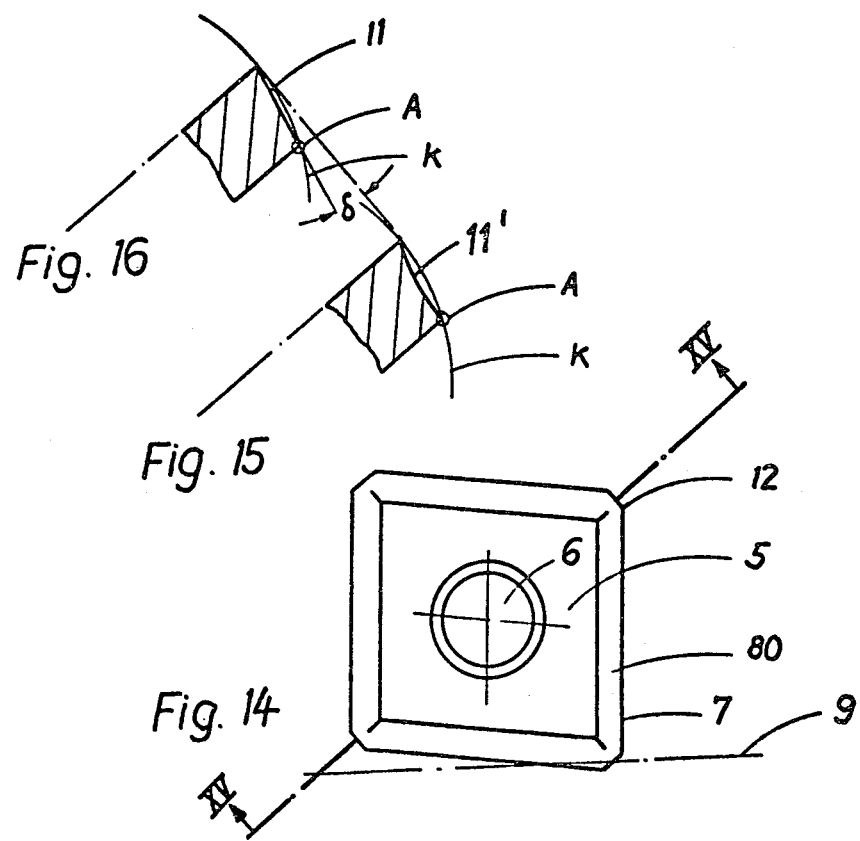

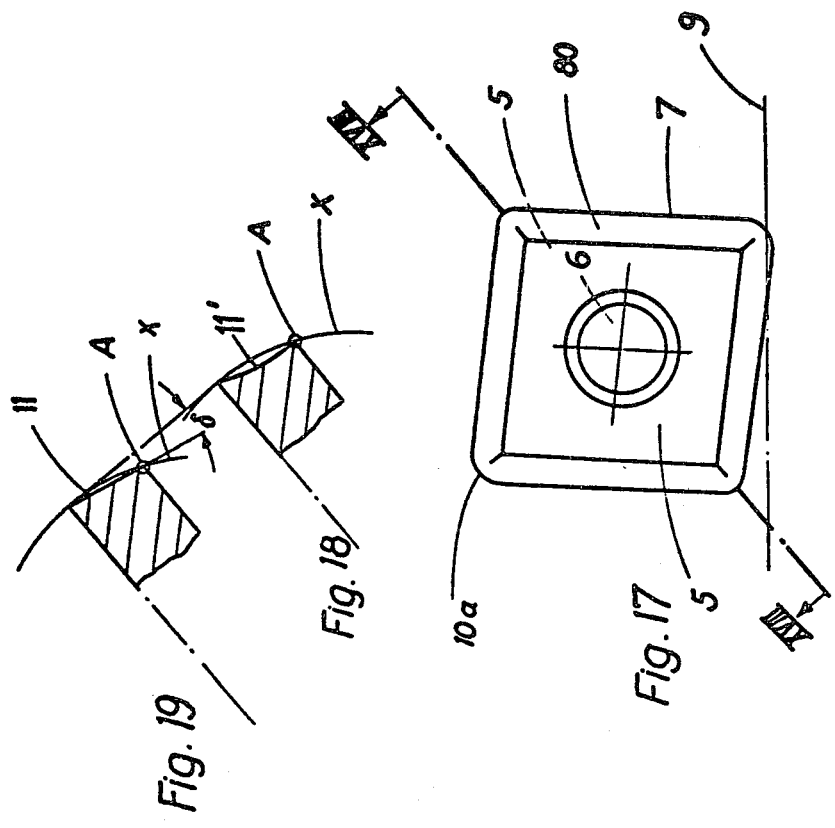

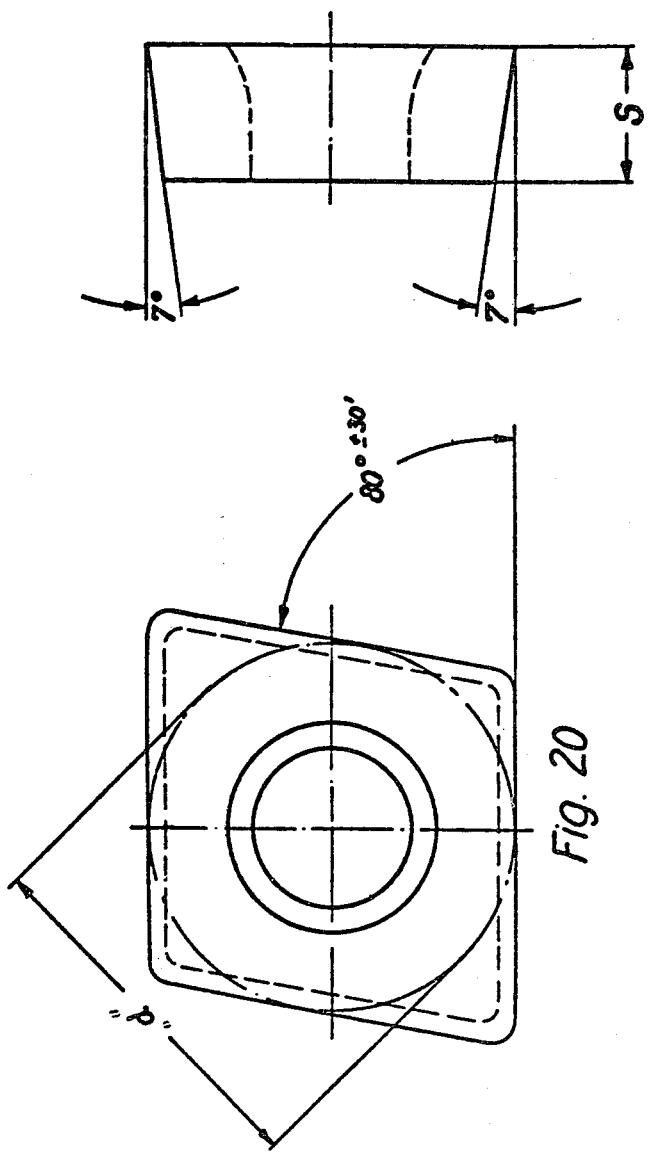

BORING TOOL

This is a continuation of application Ser. No. 013,989, filed Feb. 22, 1979, now abandoned.

Reference to related publication: German Patent Disclosure Document No. DE-OS 25 55 979.

The present invention relates to a boring tool, and more particularly to a boring tool having movable cutter chips or bits, the position of which with respect to the tool body can be changed to provide a plurality of cutting surfaces or cutting faces and thus permit replacement of a worn cutting edge by a new one without replacement of the entire cutter bit.

BACKGROUND AND PRIOR ART

Boring tools having movable, typically rotatable cutter chips or bits, have been previously described—see German Patent Disclosure Document No. DE-OS 25 55 979. This publication shows a boring tool in which rotatable cutter chips or bits are set into the tool end such that they include an axial angle of 0°, or only of a few degrees. The main cutting edge of one of the bits located close to the axis of the boring tool extends over the axis, to cut along the boring tool axis. This placement is intended to prevent the formation of a small projecting tip of the material of the workpiece which remains in the middle of the bore hole, and which must be continuously torn off by chips from the remaining boring operation. In actual practice it has been found that high axial feeds of the boring tool result in some radial deflection thereof so that the main cutter bit located adjacent the axis of the boring tool can shift from beyond the actual center point. This, then, will again leave a small tip of material of the workpiece. If the feed speed is reduced, for example to zero feed, this tip is squeezed off, since the main cutting blades, upon axial unloading, will again center themselves. In the region where this squeezing or compression and deformation of the material occurs, however, high forces are applied against the hard metal cutter bit and the cutter bit may crack or chip or nick or, in a limiting case, may fracture entirely, rendering the cutter bit in the region of the main cutting area useless for further operation.

THE INVENTION

It is an object to construct a boring tool with a movable, typically rotatable cutter bit, or cutter bits, in which the danger of damage or possible destruction of the main cutting edge in the region of the central axis of the bore is avoided and which, additionally, has long life while providing for excellent axial guidance.

Briefly, the cutter bit located adjacent the bore hole axis is formed with a plurality of cutting edges intersecting each other at angles, for example essentially at right angle. The meeting edges are connected together by an auxiliary cutter edge which is angled or rounded and connects the two adjacent main cutting edges, and positioned such that the auxiliary cutting edge is located on the boring tool to intersect the axis of the boring tool.

The auxiliary cutting edge has the effect of leaving in the center of the bore hole a conical tip which is constantly cut and reduced in size by the auxiliary edge. The boring tool, thus, is not forced from a central position but, rather, receives a stabilizing force effect. The tip remaining in the center of the workpiece cannot push laterally the cutter blade which is located close to the center of the boring tool if the axis of the boring tool should shift.

Preferably, the auxiliary edge is positioned at the end of the cutting bit edge with some relief behind it to facilitate the cutting operations and conditions of the auxiliary edge.

Drawings, illustrating preferred examples, wherein:

FIG. 2 is a fragmentary view to a greatly enlarged scale, in side view representation, showing the cutter bit closest to the axis of the boring tool;

FIG. 3 is an illustration of the element of FIG. 2, rotated by 90° in a fragmentary end view;

FIG. 5a is a view similar to FIG. 4 and showing yet another embodiment;

FIG. 6 is a perspective view of a cutter bit for the boring tool of FIG. 1;

FIG. 10 is an end view of the boring tool of FIG. 1;

FIG. 11 is a fragmentary side view illustrating overlap of the cutting regions of two cutter bits of the tool of FIG. 10;

FIG. 11a is a view similar to FIG. 11 and showing the cut being made in a workpiece;

FIG. 14 is a cutter bit, in operating position;

FIGS. 15 and 16 show the cutter bit of FIG. 14 in section along line XV—XV of FIG. 14;

FIG. 17 is a side view of another embodiment of a cutter bit in operating position;

FIGS. 18 and 19 are sections along line XVIII—XVIII of FIG. 17;

FIG. 20 illustrates a cutter bit with ISO standard dimensions in top view;

FIG. 20a is a table of dimensions of the ISO standards; and

FIG. 21 is a side view of the cutter bit of FIG. 20.

Figure 1:
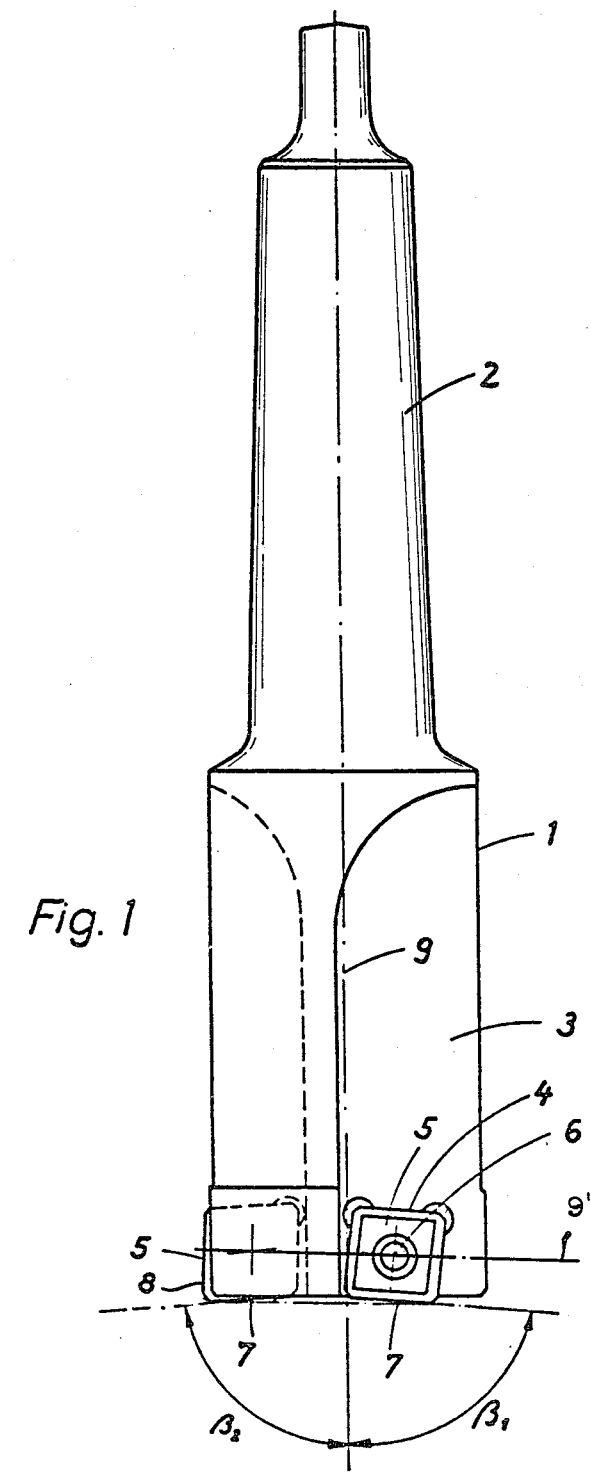
FIG. 1 is a highly schematic side view of a boring tool with rotatable cutter bits secured thereto.

The boring tool (FIG. 1) is used to bore holes in metallic workpieces or in plastic without boring a smaller hole first. The boring tool has an essentially cylindrical body 1 with a tapered shank 2, formed with the usual Morse taper. Two boring grooves or recesses 3, for chip removal, are recessed from the circumference of the tool. The recesses 3 have pocket-like portions 4 worked therein in which the respective cutter bits or chips 5 are located.

Figure 13:
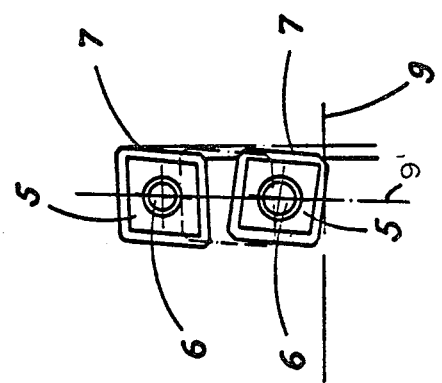
FIG. 13 is an illustration similar to FIG. 11 showing overlap of the cutting regions of the cutter bits of FIG. 12.

The cutter bits 5—see particularly FIG. 6—are essentially truncated pyramids. They have a central bore 6 to permit connection to the body 1 of the boring tool by a screw, not shown. The bits 5 are positioned on the body essentially along a line 9' perpendicular to the axis 9 of the tool body, see FIGS. 1 and 13.

Each one of the bits 5 has four main cutting edges 7 which, as well known, can be used sequentially. A chip breaking groove or relief 80 is is located adjacent each of the main cutting edges 7. The general top view shape of the bits is a rhombus- or parallelogram-type square (see, for example, FIGS. 1, 2).

The boring tool is equipped with at least two cutter bits 5. The radial position of the respective cutter bits is such that the effective cutting edges 7 overlap with respect to workpiece removal at the end face of the boring tool 1—see FIGS. 10, 12, 13. The radially outer cutter bit 5 has one cutting edge 8 (FIG. 1) which defines the diameter of the bore. The radially inner cutter bit 5 has its main cutting edge 7 so positioned that it ends approximately in the region of the axis 9 of the boring tool. The two cutter bits are secured in the body 1 of the boring tool by lead angles $\beta_1$ and $\beta_2$, the angles usually differing from 90° with respect to the central axis 9 of the tool. In the arrangement illustrated in FIG. 1, the two angles $\beta_1$ and $\beta_2$ are approximately equal. These angles can be different, however; making the angles less than 90° and equal results in the stepped bore hole profile 101 in a workpiece 105 of FIG. 11a, since the inner cutter bit will cut deeper at its outermost edge than the outer bit at an equivalent radial distance—see FIG. 1.

The bits 5—see FIG. 6—are formed with four main cutting edges 7. These main cutting edges 7 are connected at the corners by auxiliary cutting edges 10. This auxiliary cutting edge 10 may be straight—see FIGS. 4, 6 or it may be rounded as shown at 10a in FIG. 5, or may be formed as portions of a polygon, see edges 10b of FIG. 5a. The auxiliary cutting edges, collectively shown at 10, can be made by grinding a relief surface 11 off from the corners of the bits 5, thus forming the edge 10 and a recessed surface 11 which, generally, is essentially V-shaped. The auxiliary cutting edge 10a of FIG. 5 preferably forms portion of a circle; the edges 10b of FIG. 5a may, for example, form the sides of an octagon, or another portion or sector of a polygon, in which the respective auxiliary portions of the auxiliary cutting edge 10b include the same angle with each other, but this is not a necessary requirement; the angle between the respective cutting edge portions, and between the cutting edge portions 10b and the main cutting edges 7 may be different.

Independent of the respective shape of the particular auxiliary cutting edge 10, 10a, 10b, the relief surface 11 is formed therebeneath which sets off the cutting edge from the remainder of the bit. The relief surface 11 extends to the rear side of the cutting bit.

Figure 8:
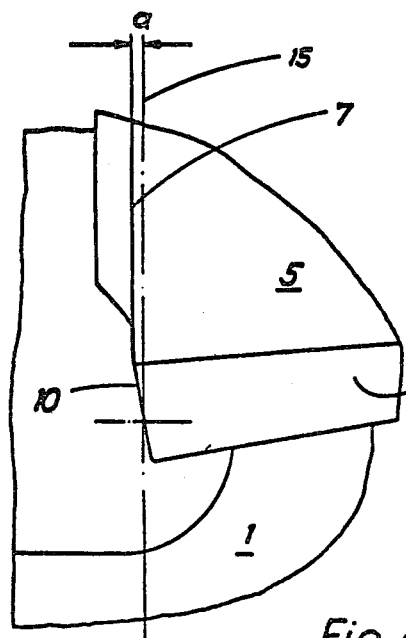
FIG. 8 is a fragmentary end view of the portion of FIG. 7, in which the cutter bit is flipped by 90°.
Figure 9:
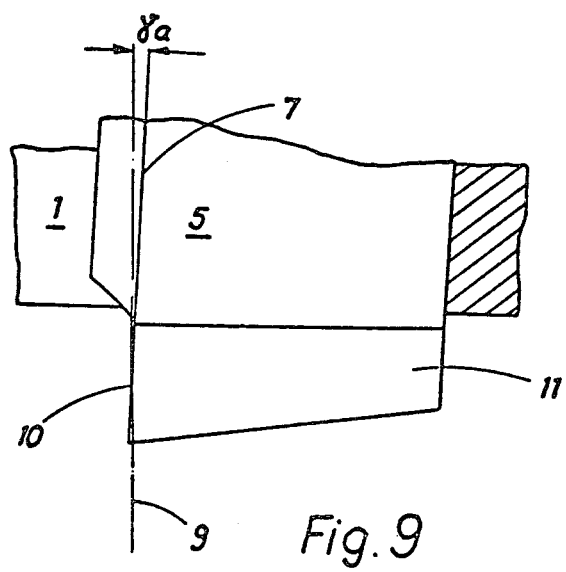
FIG. 9 is a fragmentary side view of the portion of FIG. 8, in which the cutter bit is flipped 90°, with partially broken away the shank of the boring tool.

The bits 5 are secured to the body 1 of the boring tool with positive axial angle $\gamma_a$ (FIG. 9). Additionally the main cutting edge 7 extends slightly forwardly beyond the central axis 9 of the boring tool body by a distance "a"—see FIG. 8—i.e. the main cutting edge 7 is set off by the distance "a" with respect to the parallel radius 15 in the direction of rotation.

Figure 4:
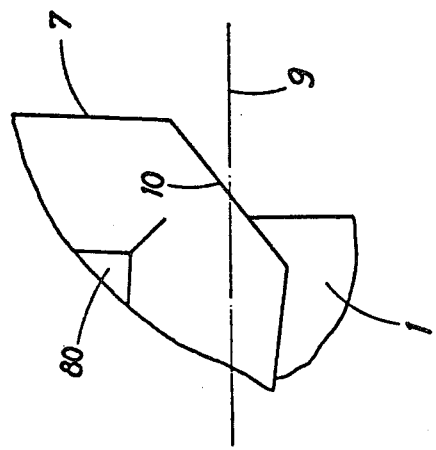
FIG. 4 is a fragmentary view to a still more enlarged scale of the portion of the cutter within the circle marked X of FIG. 2.

The axial angle $\gamma_a$ and the offset "a" are selected in such a way that the innermost partial or auxiliary edge 10 of the bit 5 which is closest to the axis 9 of the tool intersects the axis 9 of the tool, as clearly shown in FIG. 4. The angle $\alpha$—FIG. 2—which is enclosed between a straight auxiliary edge 10 and the axis 9 of the tool is preferably between 65° and 30°. The axis 9 passes centrally through the auxiliary cutting edge 10.

Figure 5:
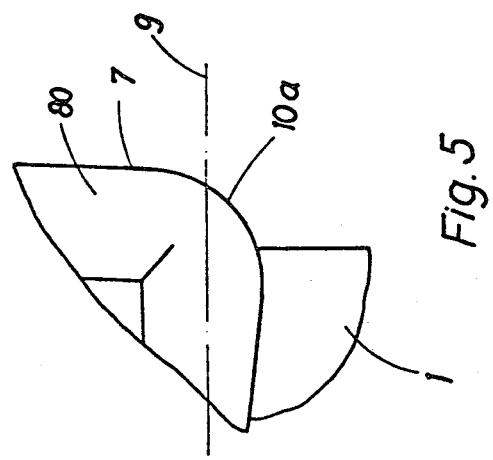
FIG. 5 is a view similar to FIG. 4 and showing another embodiment.

Even with the embodiment having rounded or polygonal auxiliary cutting edges 10a, 10b according to FIGS. 5, 5a, the arrangement of the innermost cutter bit 5 is such that the axis 9 of the boring tool passes through the auxiliary cutting edge 10, 10a, 10b, respectively, as seen in FIGS. 4, 5 and 5a.

Figure 7:
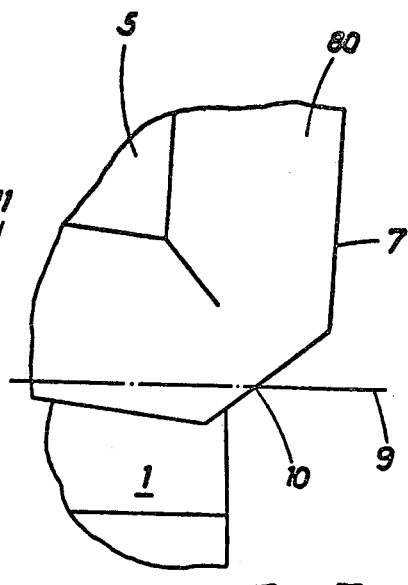
FIG. 7 is a view similar to FIG. 4 and showing the region within the circle marked X of FIG. 2 in side view, and to yet another scale, to illustrate relationships and dimensions.

The positive angle $\gamma_a$ in combination with the offset "a" provide that the axis of rotation of the boring tool passes through the auxiliary cutting edge during the complete cutting operation. In case of possible radial deflection of the boring tool, which may be caused by cutting forces acting perpendicularly with respect to the effective main cutting edge 7, the axis of rotation of the boring tool will still penetrate the auxiliary cutting edge—see FIGS. 7 and 8.

In use, and assuming that a hole is to be bored in the workpiece, the boring tool will penetrate into the workpiece and a conical tip 100 (FIGS. 1a, 1b) will be left in the bottom of the bore hole which is constantly worked off or cut by the auxiliary edge 10, 10a, 10b. The conical tip 100 will provide for radial guidance of the boring tool. In contrast thereto, with a boring tool of the prior art a substantially cylindrical tip is produced, which has to be squeezed off by the cutting edge from time to time and which may damage the cutting bit if the cylindrical tip is bent by deflection of the boring tool during the boring operation.

The dimensions of cutting bits are subject to standards. It is thus not always possible to equalize the cutting force torques acting on the effective main cutting edges 7 of the respective cutter bits 5 secured to the boring tool body 1. The cutting torque of the radially inwardly bit 5—FIG. 10—is constant for a selected arrangement of cutting edges for any particular size of cutter bit. The cutting force or torque of the radially outer bit 5, however, changes in dependence on the diameter of the boring tool which can readily be seen with reference to FIG. 10. Let $F_1$, $F_2$ be the resulting cutting forces acting on the radially inner and radially outer bits 5, respectively, and let $r_1$, $r_2$ be the relative outer radius associated with the respective cutting bit, then, since $r_1$ is not equal to $r_2$, likewise $F_1 \times r_1$ will not be equal to $F_2 \times r_2$ if $F_1 = F_2$.

Different cutting torques acting on the boring tool head 1 may result in different radial deflection of the boring tool. To counteract such radial deflection, the bits 5 are also used to guide the boring tool body. The 12 in circle corner 79 behind the cutting edge 7 at the end of the relief surface 11 outer corner 12 (FIG. 10), i.e. with respect to the innermost bit 5, the corner, remote from the axis 9 of the boring tool is used to this end. FIG. 10 shows the cutting circles of the respective bits in chain-dotted lines. The angle $\delta$—FIGS. 16, 19—of the cutter plate within the region of the relief surface 11 is so selected that the rear edge that is, effectively, the corner A behind the cutting edge 7, of the bit 5 will be supported by sufficient material and thus have sufficient strength to guide the cutter bit in the borehole circle X a (FIGS. 16, 19). The radially inner cutter bit cuts the inner portion of the workpiece with the respective main and auxiliary cutting edges 7 and 10, 10a, 10b. The tool body 1 provides support for the bit upon cutting, or material removal operation by the tool both by the main cutting edge 7 and the auxiliary cutting edge 10, cutting an essentially conical surface.

If the angle $\delta$ within the region of the relieved surface 11 cannot be suitably matched to the forces being encountered upon cutting, a similar effect can be obtain by suitable selection of the offset "a" and/or the axial angle $\gamma_a$ of the cutter bit.

The relieved surface 11 can be straight—see FIG. 16, or may be slightly concave as shown at 11', FIG. 15. A similar effect can be obtained if the rounded auxiliary edge 10a is used—FIG. 17—and the material of the bit therebeneath is relieved so that a suitable clearance angle $\delta$ is obtained, as seen in FIGS. 18 and 19. The surface may, in cross section, be straight—see surface 11 in FIG. 19, or may be concave—see surface 11' in FIG. 18.

Figure 12:
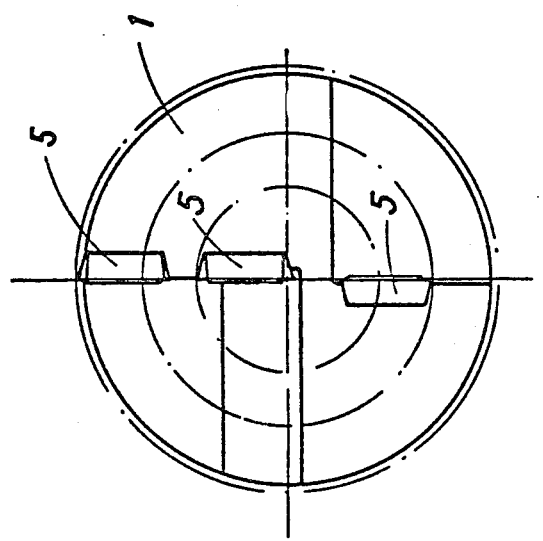
FIG. 12 is an end view similar to FIG. 10 and illustrating a boring tool with three cutter bits.

Various changes and modifications may be made; for example, boring tools of greater diameter may be constructed having more than two bits. The boring tool so far described was designed for use with two bits 5, subdividing the main cutting region, and sharing a range of cut. Three or more cutting tools may be used, however; FIG. 12 shows three cutting bits 5 having their main cutting edges 7 overlapping according to FIG. 13. The outer cutting circumference of each of the bits shown is in chain-dotted lines in FIG. 12.

The boring tool is guided in the bore hole not only by supporting the back corner A of the radially innermost cutter bit but also, selectively additionally,, by the back corner A of a radially further outwardly positioned cutting bit 5 (FIG. 1d) the back corners A of a number of such cutting bits as shown in FIG. 12, for example. Since the cutter bits 5 are positioned on the tool body 1 essentially along a straight line 9' transverse to the axis 9 of the body, each will cut a shallow conical or part-conical portion (see FIG. 11a). This is best seen in FIGS. 11 and 11a, where the bits both have a lead angle $\beta$ of less than 90°, and where the individual cuts by the respective bits are clearly apparent.

Boring tools to cut big openings, for example bores over 26 mm (somewhat over 1") may use cutter bits 5 in accordance with the ISO (International Organisation for Standardisation) standard. FIGS. 20, 20a and 21 illustrate cutter bits according to standards, and FIGS. 20a is a table illustrating the use of such ISO standard bits. Which specific bit is to be used for what diameter of bore hole is likewise reproduced in the table of FIG. 20a.

In a preferred embodiment, the auxiliary cutting edge 10 has an angle of between 65° to 30° with the longitudinal axis 9 of the boring tool. This angle is not critical. The main cutting edge is preferably set forward with respect to a radius parallel thereto—in the direction of rotation of the drill—by the value "a" which has as a result that the main cutting edge is slightly forward over the center of the drill. This, in combination with the positive axial angle with which the cutter bit is inserted, ensures that radial excursion due to cutting forces acting on the main cutting edge will cause these forces to pass through the auxiliary cutting edge so that, within the center of the bore hole, the cutting conditions will always be precise and centered position of the entire boring tool is ensured. FIG. 8 illustrates the forward offset of the cutter bit 5 with respect to a plane passing through radius 15 and the central axis 9 of the boring tool.

In its simplest form, the auxiliary edge 10 is straight by merely grinding off a straight side from the corner of the bit, resulting in an essentially V-shaped regressing surface 11. By choice of a positive axial angle, in combination with the main bit 7 extending over center, the generatrix of the cone cut by the auxiliary edge in the workpiece is not straight, but slightly concave. A similar effect could be obtained by making the auxiliary edge in form of a polygon sector—see FIG. 5a—by forming the auxiliary edge of portions with different angles with respect to the central axis of the boring tool, or put in other words, with respect to an adjacent edge of the bit. The auxiliary cutting edge can also be curved, preferably circular—see FIG. 5.

Radial deflection of the boring tool due to different distribution of cutting forces on the bits must be counteracted by the entire system: tool—boring machine—workpiece. Under extreme conditions, for example due to unstable spindles of the boring machine, worn bearings, large openings or excessive feed, insufficiently secure clamping of the workpiece, or the like, it is possible that the limit of stiffness of the overall system is exceeded. In order to still provide for perfect boring, and shape of the bore hole, it is known to guide the boring tool by separate guide strips so that the position of the main cutting edges with respect to the ideal axis of the boring tool is ensured. It has been proposed to apply guide strips to boring tools which have their own boring edges at the front face; this is hardly possible, however, with boring tools which have multi-faceted bits. The tolerance of the mult-faceted bits are, usually, in the order of magnitude of a few hundredths millimeter; the resulting bore thus may have deviations or tolerances of 5/100 to 8/100 mm from the ideal value. If guide strips or guide ridges are to be effective, they have to be dimensioned to be as close to the desired ideal value of the bore as possible. If the diameter of the outer circle of rotation of the guide strips is below the desired level, then the guide strips become ineffective. If they are over the actual cutting width, then, in short order, the guide strips or ridges will become damaged since they then will, effectively, operate like reamers.

It has been found that the boring tool is self-guiding due to the positioning of the bits and their special shape. To obtain self-guiding, the arrangement is preferably so made that the cutter bits themselves are supported on the tool—as explained in connection with FIGS. 14 to 19, and support point 12 in circle A. This is obtained by suitable dimensioning of the relief angle of the cutter bit, and/or suitable choice of radial and/or axial angle of at least one of the cutter bits at their main cutting edges. Thus, the rear edge, opposite the cutting edge, can be supported with respect to the surface cut off from the workpiece (see FIGS. 14, 15 and 17, 18), where point 12 in circle A is on the bore hole circle "X". The relief provided can be either a straight surface, or can be curved, for example inwardly concave as seen in FIGS. 16 and 18.

Various changes and modifications may be made within the scope of the inventive concept.

In a typical example for a boring tool to bore an opening having 45 mm diameter, the following are suitable relationship and dimensions:

| | |
|---|---|
| diameter of shaft or head 1: | 45 mm |
| number of bits 5: | 2 |
| dimension of bits 5: | 12,7 mm × 12,7 mm × 4,76 mm |
| type of auxiliary cutting edge: | straight according to FIG. 4 |
| angles $B_1$, $B_2$: | 87° |
| radial offset distance "a": | 0,2 mm |
| axial angle $\gamma_a$: | 3° |
| relief angle $\delta$: | 8° |
| auxiliary edge angle $\alpha$: | 38° |
| skew angle of rhombus of bit 5: | 86° |
| cutting speed: | 125 m/mim |

| | |
|---|---|
| -continued | |
| feed: | 180 mm/min |

We claim:

1. Boring tool to cut a hole in a workpiece having a tool body (1, 2) having a longitudinal central axis (9);

at least two radially staggered recesses (4) at the end face of the tool body;

a cutter bit (5) located in each recess (4) at the end face of the tool body, said cutter bits having positive axial angles ($\gamma_a$) with respect to said axis and each being located at different radial distances from the central axis (9);

said cutter bits (5) being, in plan view, generally square or parallelogram-shaped defining sides and corners and of truncated pyramidal shape, having main cutting edge (7) along sides of the large base of the truncated pyramid;

and means (6) to removably secure said cutter bits to the tool body and to permit presentation, selectively, of different cutting edges to a workpiece in accordance with the position of the cutter bits on the tool body;

wherein at least the radially innermost cutter bit is formed with auxiliary cutting edges (10, 10a, 10b) at the corners adjacent the main cutting edges and connecting said main cutting edges at an obtuse angle with respect to said main cutting edges; wherein:

said radially innermost cutter bit is located on the body with the radially inner auxiliary cutting edge (10, 10a, 10b) intersecting said central axis (9);

wherein said cutter bits (5) are positioned on the tool body in radially overlapped position such that the main cutting edges (7) thereof will form with the central axis (9) of the tool, and taken in the direction of the cut or feed of the tool, lead angles ($\beta_1$, $\beta_2$) of less than 90° to locate the auxiliary cutting edges (10, 10a, 10b) at the radially outer corners of the respective bits axially in advance of the radially inner corners of the respective bit, and such that at least a portion of the radially outer auxiliary cutting edge (10, 10a, 10b) of a radially inner bit is located axially in advance of the main cutting edge (7) of the next radially outer bit at the radial position of said radially outer auxiliary cutting edge, so that the main edges of said bits will cut shallow conical surfaces in the workpiece, the outer auxiliary cutting edges (10, 10a, 10b) will cut stepped grooves concentric with said central axis (9) and the radially inward auxiliary cutting edge of the radially innermost cutter bit will additionally cut across the central axis, the overlap position of said cutter bits on the tool body (1) relieving the auxiliary cutting edges at the radially inner corner of the outer cutter bit or bits from cutting action due to removal of workpiece material at the respective radial position by the radially outer portion of the main cutting edge and the adjacent radially outer auxiliary cutting edge (10, 10a, 10b) of the adjacent radially inner cutter bit;

wherein the cutting action of the radially innermost cutter bit effects cutting into the workpiece with its main cutting edge in accordance with the cutting edge lead angle ($\beta_1$, $\beta_2$) and its radial position on the tool body, the auxiliary cutting edge (10, 10a, 10b) at the radially outer corner of the innermost cutter bit, of which at least a portion is positioned axially in advance of, and radially outwardly with respect to, the auxiliary cutting edge of the radially inner corner of the adjacent radially outer cutter bit, cuts said stepped groove concentric with said control axis (9) to provide for self-centering of the tool within the bore; and wherein the cutting action of a cutter bit adjacent a radially inner cutter bit effects cutting of the workpiece with its main cutting edge in accordance with its cutting edge lead angle ($\beta_1$, $\beta_2$) and its radial position on the tool body, and the auxiliary cutting edge (10, 10a, 10b) of the radially outer corner of said radially outer cutter bit and being positioned axially in advance of the auxiliary cutting edge at the radially inner corner thereof additionally cuts a stepped groove concentric with said central axis to further enhance and support said self-centering of the tool.

2. Tool according to claim 1, wherein (FIG. 4) the auxiliary edge (10, 10', 10'') forms an angle $\alpha$ of between 30° to 65° with the central axis (9) of the body (1).

3. Tool according to claim 1, wherein the main cutting edge (7) is offset forwardly—in the direction of rotation of the boring tool body—by a predetermined offset (a) with respect to a radius (15) parallel to said main cutting edge (7).

4. Tool according to claim 1, wherein (FIG. 4) the auxiliary cutting edge (10) is straight.

5. Tool according to claim 1, wherein (FIG. 5a) the auxiliary cutting edge is of polygonal shape.

6. Tool according to claim 5, wherein the auxiliary cutting edge is formed by a group of cutting edge portions connected in said polygonal shape, said cutting edge portions being related to each other by the same connection angle.

7. Tool according to claim 1, wherein the auxiliary cutting edge is formed by a group of cutting edge portions connected in said polygonal shape, said cutting edge portions being related to each other by different connecting angles.

8. Tool according to claim 1, wherein (FIG. 5) the auxiliary cutting edge (10a) is curved.

9. Tool according to claim 8, wherein the curvature of the auxiliary cutting edge (10a) is circular.

10. Tool according to claim 1, wherein a relief surface (11, 11') is formed immediately adjacent the auxiliary cutting edge and extending along the thickness of the respective cutter bit (5).

11. Tool according to claim 10, wherein (FIGS. 15,18) the auxiliary relief surface (11') is concave.

12. Tool according to claim 1, wherein the pyramid angle ($\delta$) of the truncated pyramid formed by the cutter bit (5) in the region of the cutting edges of the cutter bit remote from said auxiliary cutting edge passing through the central axis (9) of the tool body, and the thickness of the cutter bit are dimensioned such that the rear edge (A) of the cutter bit and behind the main cutting edge (7)—with respect to the thickness thereof—engages, and is guided by the wall surface of the cut in the workpiece.

13. Tool according to claim 1, wherein at least one cutting bit (5) is supported and guided at the rear edge and behind the main cutting edge (7) in the region of its radially outer corner (A) against the surface behind the cut in the workpiece, said support and guidance being effected by relative dimension of the offset (a) of the bit on the body.

14. Tool according to claim 1, wherein at least one cutting bit (5) is supported and guided at the rear edge behind the main cutting edge (7) in the region of its radially outer corner (A) against the surface behind the cut in the workpiece, said support and guidance being effective by relative dimensions of the axial angle ($\gamma_a$) of the position of the bit on the body.

15. Tool according to claim 14, wherein the relative dimension of the offset (a) of the bit on the body is selected to additionally effect said support and guidance.

16. Tool according to claim 13, wherein the radially innermost bit is supported and guided at the rear edge behind the main cutting edge (7) in the region of its radially outer cutting corner (12).

17. Tool according to claim 14, wherein the radially innermost bit is supported and guided at the rear edge in the range of its outer cutting corner (12).

18. Tool according to claim 1, wherein, for boring diameters in excess of 26 mm, the cutter bits have the following dimensions:

| "d" | "S" | Diameter of Tool |
|---|---|---|
| 9,525 | 3.18 | 26–35 mm |
| 12.7 | 4.76 | 36–46 mm |
| 15.88 | 4.76 | 47–60 mm | and wherein "d" is the dimension of an included circle within the square or parallelogram-shaped plan view of the cutter bit and "S" is the thickness of the cutter bit;

and wherein said cutter bits have pyramid angles ($\delta$) of about 7°.

* * * * *